US009278495B2

(12) United States Patent
Nair et al.

(10) Patent No.: US 9,278,495 B2
(45) Date of Patent: *Mar. 8, 2016

(54) RUBBER REINFORCED ARTICLE WITH HIGH MODULUS, RECTANGULAR CROSS-SECTION FIBERS

(75) Inventors: Sujith Nair, Greer, SC (US); Padmakumar Puthillath, Greer, SC (US); Johann Peschek, Ghent (BE); Charles W. Prestridge, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 810 days.

This patent is subject to a terminal disclaimer.

(21) Appl. No.: 13/196,975

(22) Filed: Aug. 3, 2011

(65) Prior Publication Data

US 2013/0034718 A1    Feb. 7, 2013

(51) Int. Cl.
*B29D 30/38* (2006.01)
*B32B 27/08* (2006.01)
*B32B 27/34* (2006.01)
*B32B 27/36* (2006.01)
*B32B 3/08* (2006.01)
*B60C 9/11* (2006.01)
*B60C 9/00* (2006.01)
(Continued)

(52) U.S. Cl.
CPC . *B29D 30/38* (2013.01); *B32B 3/08* (2013.01); *B32B 27/08* (2013.01); *B32B 27/34* (2013.01); *B32B 27/36* (2013.01); *B60C 9/0064* (2013.04); *B60C 9/11* (2013.01); *B29D 30/44* (2013.01); *B29D 30/50* (2013.01); *Y10T 152/10828* (2015.01); *Y10T 428/24994* (2015.04)

(58) Field of Classification Search
CPC ........ B60C 9/0064; B60C 9/11; B60C 15/00; B29C 47/0057; B29C 47/0066; B29C 47/0021
USPC ............. 428/297.4; 442/59–180; 156/244.11, 156/244.18
See application file for complete search history.

(56) References Cited

U.S. PATENT DOCUMENTS 1,875,517 A       9/1932  Steere
3,431,962 A   *   3/1969  Kovac et al. .................. 152/556
3,486,962 A   *  12/1969  Gallagher ..................... 156/441
(Continued)

FOREIGN PATENT DOCUMENTS

DE        44 24 279       1/1996
EP        0 434 654       6/1991
(Continued)

OTHER PUBLICATIONS

Patent Cooperation Treaty PCT International Search Report. Date of Mailing, Apr. 18, 2013, International Application No. PCT/US2012/046070, International Filing Date, Jul. 10, 2012.

*Primary Examiner* — Jacob T Minskey
*Assistant Examiner* — Camie Thompson
(74) *Attorney, Agent, or Firm* — Cheryl J. Brickey (57) ABSTRACT

A reinforced rubber article containing a rubber article and a fibrous layer embedded into the rubber article. The fibrous layer contains monoaxially drawn tape elements having a rectangular cross-section and at least a first layer having a draw ratio of at least about 5, a modulus of at least about 2 GPa, a density of at least 0.85 g/cm$^3$. The first layer contains a polymer selected from the group consisting of polyamide, polyester, and co-polymers thereof. Methods of forming the reinforced rubber article are also disclosed.

27 Claims, 8 Drawing Sheets

(51) Int. Cl.
*B29D 30/44* (2006.01)
*B29D 30/50* (2006.01)

(56) References Cited

U.S. PATENT DOCUMENTS

| | | | |
|---|---|---|---|
| 3,651,201 A | 3/1972 | Brignac et al. | |
| 3,713,347 A | 1/1973 | Atwell et al. | 74/231 R |
| 3,716,611 A | 2/1973 | Chapman | 264/290 N |
| 3,723,239 A | 3/1973 | Takemura et al. | 161/170 |
| 3,938,313 A * | 2/1976 | Marzocchi | 57/207 |
| 4,024,895 A | 5/1977 | Barron | 139/426 R |
| 4,095,012 A | 6/1978 | Schirmer | 428/474 |
| 4,167,614 A | 9/1979 | Ciferri et al. | 525/4 |
| 4,181,550 A | 1/1980 | Paine | 156/164 |
| 4,184,589 A | 1/1980 | Habegger | 198/847 |
| 4,416,935 A | 11/1983 | Bascom et al. | 428/229 |
| 4,850,412 A | 7/1989 | Gupta | 152/556 |
| 5,073,453 A | 12/1991 | Knorr | 428/373 |
| 5,082,713 A | 1/1992 | Gifford | 428/107 |
| 5,106,946 A | 4/1992 | Clark, III et al. | 528/335 |
| 5,186,771 A | 2/1993 | Carpentier et al. | 152/158 |
| 5,223,187 A * | 6/1993 | Chantry et al. | 264/178 F |
| 5,240,772 A | 8/1993 | Henning | 428/400 |
| 5,262,099 A | 11/1993 | Adams et al. | 264/25 |
| 5,323,829 A | 6/1994 | Hubbell et al. | 152/527 |
| 5,616,209 A | 4/1997 | Laurent et al. | 156/397 |
| 5,733,654 A | 3/1998 | Inada et al. | 428/395 |
| 5,741,601 A | 4/1998 | Kishida et al. | 428/474.4 |
| 5,885,387 A | 3/1999 | Ueyoko | 152/540 |
| 6,148,885 A | 11/2000 | Spragg et al. | 152/197 |
| 6,597,954 B1 | 7/2003 | Pless et al. | 607/62 |
| 6,613,173 B1 | 9/2003 | Ogawa | 156/117 |
| 6,849,146 B2 | 2/2005 | Hitotsuyanagi et al. | 156/117 |
| 7,000,662 B2 | 2/2006 | Herbelleau et al. | 152/544 |
| 7,252,129 B2 | 8/2007 | Michiels et al. | 152/531 |
| 7,614,436 B2 | 11/2009 | Ternon et al. | 152/526 |
| 7,666,499 B2 | 2/2010 | Jung et al. | 428/364 |
| 7,931,062 B2 | 4/2011 | Michiels et al. | 152/533 |
| 8,651,157 B2 * | 2/2014 | Michiels et al. | 152/451 |
| 2002/0050313 A1 * | 5/2002 | Inoue | B60C 9/00 152/209.4 |
| 2003/0000619 A1 * | 1/2003 | Nakamura et al. | 152/525 |
| 2003/0194543 A1 | 10/2003 | Kawabata et al. | 428/294.1 |
| 2004/0145092 A1 | 7/2004 | McCollum et al. | 264/544 |
| 2004/0242103 A1 * | 12/2004 | Loos et al. | 442/185 |
| 2006/0002729 A1 | 1/2006 | Yoshizuka et al. | 399/55 |
| 2009/0159171 A1 | 6/2009 | Volpi | 152/527 |
| 2010/0282392 A1 | 11/2010 | Deal | 152/551 |
| 2011/0104486 A1 | 5/2011 | Ma et al. | 428/355 |
| 2012/0090755 A1 | 4/2012 | Deal | 152/527 |
| 2012/0121840 A1 * | 5/2012 | Aksay et al. | 428/36.9 |
| 2012/0237749 A1 * | 9/2012 | Aksay et al. | 428/221 |
| 2013/0032266 A1 * | 2/2013 | Nair et al. | 152/526 |

FOREIGN PATENT DOCUMENTS

| | | |
|---|---|---|
| EP | 0 423 806 | 8/1994 |
| JP | 57 34125 | 2/1982 |
| JP | 5 504586 | 7/1993 |
| WO | WO 93/10294 | 5/1993 |
| WO | WO 00/68301 | 11/2000 |
| WO | WO 03/031713 | 4/2003 |
| WO | WO 2010/015809 | 2/2010 |
| WO | WO 2012/049206 | 4/2012 |

* cited by examiner

RUBBER REINFORCED ARTICLE WITH HIGH MODULUS, RECTANGULAR CROSS-SECTION FIBERS

RELATED APPLICATIONS

This application relates to the following co-pending applications, each filed on Aug. 3, 2011; U.S. patent application Ser. No. 13/196,981 entitled "Rubber Reinforced Article with Voided Fibers" and U.S. patent application Ser. No. 13/196,988 entitled "Rubber Reinforced Article with Voided Fibers Having Void-Initiating Particles", both of which are herein incorporated by reference in their entirety.

FIELD OF THE INVENTION

The present invention generally relates to fiber reinforced rubber articles.

BACKGROUND

Reinforced rubber goods are used in a wide variety of consumer and industrial applications. The performance of reinforced molded rubber goods depends on the adhesion of the reinforcement to the rubber. Fabrics made with synthetic yarns tend to be difficult to bond to rubber.

In practice several things are done to improve adhesion, most of them involving coating fibers and/or fabric with an adhesion promoter. For example, as the fibers are drawn a spin finish may be applied which may contain an adhesion activator such as an epoxy resin.

There remains a need for reinforced rubber articles having fibrous layers with enhanced adhesion due to geometry and other physical properties of the fibers in addition to adhesion promoting chemistries.

BRIEF SUMMARY

A reinforced rubber article containing a rubber article and a fibrous layer embedded into the rubber article. The fibrous layer contains monoaxially drawn tape elements having a rectangular cross-section and at least a first layer having a draw ratio of at least about 5, a modulus of at least about 2 GPa, a density of at least 0.85 g/cm$^3$. The first layer contains a polymer selected from the group consisting of polyamide, polyester, and co-polymers thereof. Methods of forming the reinforced rubber article are also disclosed.

DETAILED DESCRIPTION

Figure 1:
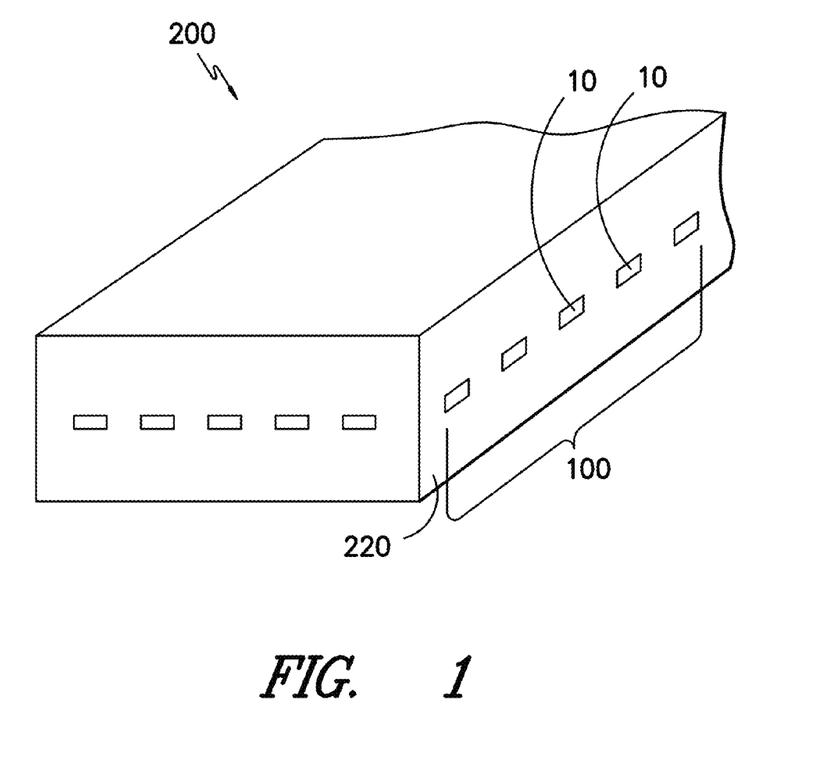
FIG. 1 illustrates schematically a fibrous layer being a woven fabric embedded in rubber.

FIG. 1 illustrates a reinforced rubber article 200 containing a fibrous layer 100 embedded into rubber 220. The fibrous layer 100 contains a plurality of fibers 10. The reinforced rubber article 200 may be any rubber article reinforced with fibers, such as tires, belts, hoses, and the like.

Figure 2:
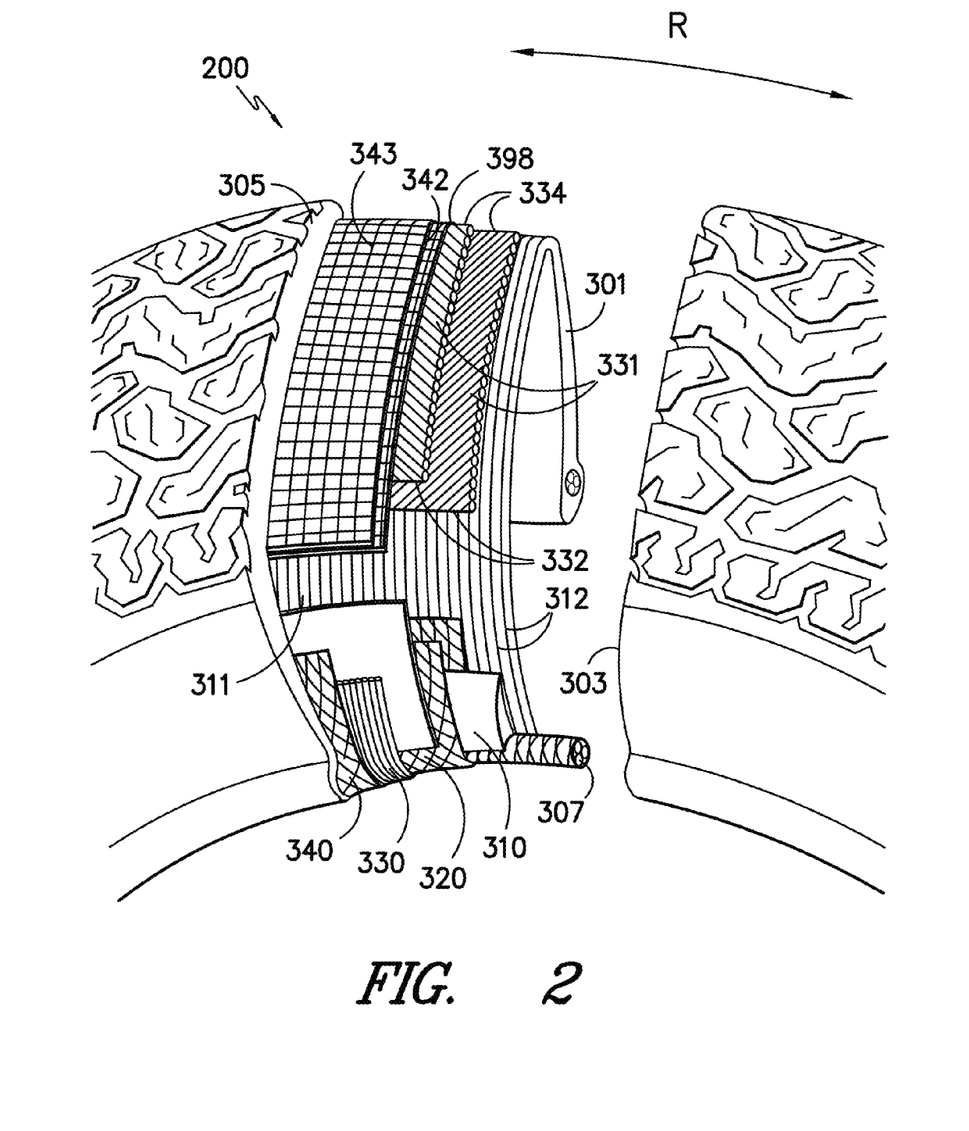
FIG. 2 is a cutaway partial view of a pneumatic radial tire.

Referring now to FIG. 2, there is shown one embodiment of a reinforced rubber article 200 being a tire, comprising side walls 303 joined to a tread 305 by shoulders. The tire 200 includes a carcass 301 covered by the tread 305. In FIG. 2, the tire 200 is a radial tire. However, the present invention is not limited to radial tires and can also be used with other tire constructions. The carcass 301 is formed from one or more plies of tire cord 312 terminating at the inner periphery of the tire in metal beads 307, with at least one belt ply 334 located circumferentially around the tire cord 312 in the area of the tread 305. The carcass 301 is constructed so that the reinforcing cords 311 are running substantially radially of the intended direction of rotation R of the tire 200. The belt plies 334 are formed with relatively inextensible warp materials 331, such as steel cord reinforcing warps, which run in the intended direction of rotation R of the tire or, more usually, at a slight angle thereto. The angle of the inextensible warp materials 331 can vary with the method of construction or application. The breakers 330 extend across the width of the tread 305 of the tire terminating in edges 332 in the area of the tire 200 where the tread 305 meets the sidewall 303.

A cap ply layer 343 is located between the belt plies 334 and the tread 305. The cap ply layer 343 shown is formed from a cap ply tape 342 wound around the tire cord 312 in the rolling direction of the tire extending over the edges 332 of the belt plies 334. Additionally, the cap ply tape 342 in FIG. 2 can be wound around the tire cord 312 a plurality of times to reduce the unbalancing effect in the tire 200 caused by the overlap splice. Alternatively, the cap ply layer 343 may be formed from a cap ply tape 342 which extends over the edge 332 of the belt plies 334 or the cap ply layer 343 may be formed from a cap ply tape 342 which is wound circumferentially around the carcass 301 of the tire 200 in a flat helical pattern. Some suitable cap ply fabrics are described in U.S. Pat. Nos. 7,252,129, 7,614,436, and 7,931,062, each of which are incorporated herein by reference in their entirety.

On top of the bead 307 is the bead apex 310 and surrounding at least partially the bead 307 and the apex 310 is a flipper 320. The flipper 320 is a fabric layer disposed around the bead 307 and inward of the portion of the turn-up end 330. A chipper 340 is disposed adjacent to the portion of the ply 330 that is wrapped around the bead 307. More specifically, the chipper 340 is disposed on the opposite side of the portion of the ply the "turn-up end" 330 from the flipper 320. The sidewall may also contain other non-shown fabric layers, for example chafer fabrics, toe protector fabrics, or fabrics wrapping around the bead, extending from the bead up the side of the sidewall, extending from the tread down the sidewall, in the shoulder area, or completely covering the sidewall. Any fabric extending between the bead and the tread is defined herein as a "sidewall fabric". This includes fabrics that also extend around the bead to the inside of the tire such as a flipper fabric, as long as at least part of the fabric is located between the bead and the tread.

A tire carcass is required to have substantial strength in the radial direction running from bead to bead transverse to the direction rotation during use. To provide this strength, the fabric stabilizing material (also known as tire cord) has typically been a woven fabric with substantially inextensible pre-stressed high tenacity yarns running in the warp direction (also known as the "machine direction") which are drawn and tensioned during the fabric formation and/or finishing process. This fabric is then cut in the cross-machine direction (i.e. transverse to the warp yarns). Individual pieces of the fabric are then rotated 90 degrees and are assembled to one another for placement in the carcass such that the high strength warp yarns are oriented in the desired radial direction between the beads. Thus, in the final construction, the weft yarns are oriented substantially circumferentially (i.e. in the direction of tire rotation.)

In another embodiment, the carcass stabilizing fabric is formed is a warp knit, weft inserted fabric having weft insertion yarns formed from the relatively inextensible reinforcing cords. Alternatively, the carcass stabilizing fabric may be a woven fabric having weft yarns formed from relatively inextensible reinforcing cords or a laid scrim. More information about this stabilizing having relatively inextensible reinforcing cords in the weft direction of the textile may be found in U.S. patent application Ser. No. 12/836,256 filed on Jul. 14, 2010, which is incorporated herein by reference in its entirety.

The fibrous layer 100 in the tire of FIG. 2 (reinforced rubber article 200) may be a cap ply, carcass ply, chafer, flipper, clipper, body ply, shoulder ply, belt ply, belt separator ply, bead wrap, belt edge wrap, or any other fibrous layer within a tire.

Figure 3:
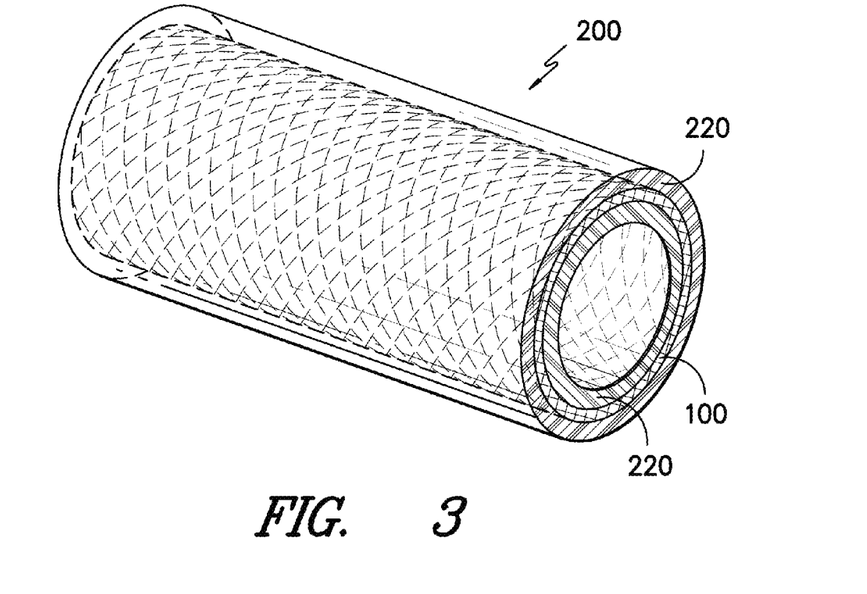
FIGS. 3 and 4 are illustrations of a reinforced rubber article being a hose.
Figure 4:
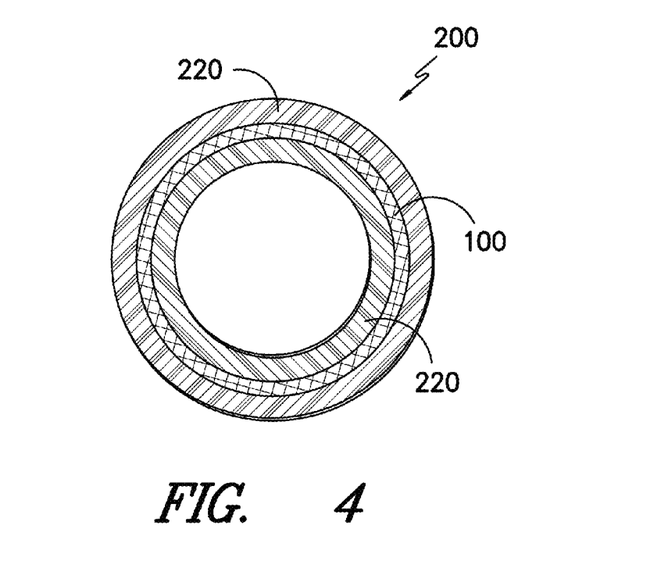

Referring now for FIGS. 3 and 4, there is shown a reinforced rubber article 200 in the form of a fabric reinforced hose. One of the most widespread and most suitable conventional hose is the so-called "mesh-reinforced" type, in which the fibrous layer 100 is formed by yarns spirally wound on the flexible hose forming two sets of yarns, the first in parallel and equidistant rows and superimposed on an equal number of transverse threads along likewise parallel and equidistant lines which are arranged symmetrically with respect to the axis of the tubular body of the hose so as to form a fabric "mesh" with diamond-shaped cells. Any other suitable fibrous layer 100 may also be used in hoses. The fibrous layer 100 is embedded into rubber 220. In addition to hoses, the fibers and fibrous layers may be used to reinforce any suitable rubber article including belts such as power transmission belts, printers blankets, and tubes.

Some other reinforced rubber products 200 include printer blankets and transmission belts. In offset lithography the usual function of a printing blanket is to transfer printing ink from a printing plate to an article such as paper being printed whereby the printing blanket comes into repeated contact with an associated printing plate and the paper being printed. Printer blankets typically include a fabric embedded into rubber. Transmission belts and other types of belts also contain reinforced rubber with fibers.

The fibrous layer 100 is formed from fibers 10. The fibers 10 may be any suitable fiber for the end use. "Fiber" used herein is defined as an elongated body. The fiber may have any suitable cross-section such as circular, multi-lobal, square or rectangular (tape), and oval. In one embodiment, the fibers are tape elements 10 having a rectangular cross-sectional shape. These tape elements may also be sometimes referred to as ribbons, strips, tapes, tape fibers, and the like.

Figure 5:
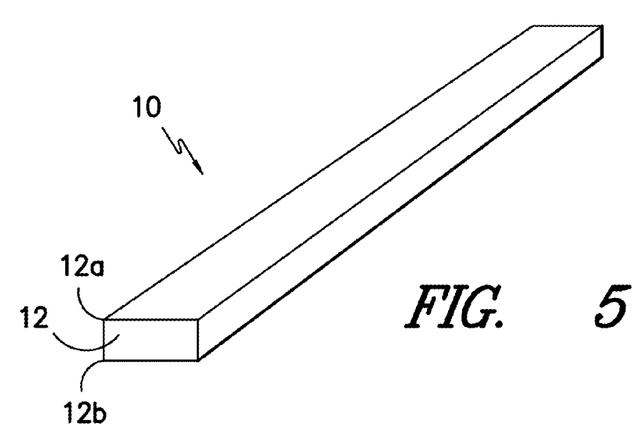
FIG. 5 illustrates schematically an embodiment of an exemplary tape element having one layer.

One embodiment of the fiber being a tape element is shown in FIG. 5. In this embodiment, the tape element 10 contains a first layer 12 having an upper surface 12a and a lower surface 12b. Preferably the tape element 10 has a rectangular cross-section. The tape element is considered to have a rectangular cross-section even if one or more of the corners of the rectangular are slightly rounded or if the opposing sides are not perfectly parallel. Having a rectangular cross-section is preferred for a variety of reasons. Firstly, the surface available for bonding is greater. Secondly, during a de-bonding event the whole width of the tape is under tension and shear points are significantly reduced or eliminated. In contrast, a multifilament yarn has very little area under tension and there are regions of varying proportions of tension and shear along the circumference of the fiber.

The first layer 12 of the fiber 10 may be any suitable orient-able (meaning that the fiber is able to be oriented) thermoplastic. Some suitable thermoplastics for the first layer include polyamides, co-polyamides, polyesters, co-polyesters, polycarbonates, polyimides, and other orient-able thermoplastic polymers. In one embodiment, the first layer contains polyamide, polyester, and/or co-polymers thereof. In one embodiment, the first layer contains a polyamide or polyamide co-polymer. Polyamides are preferred for some applications as it has high strength, high modulus, high temperature retention of properties, and fatigue performance. In another embodiment, the first layer contains a polyester or polyester co-polymer. Polyesters are preferred for some applications as it has high modulus, low shrink and excellent temperature performance.

In one embodiment, the tape elements preferably have a draw ratio of at least about 5, a modulus of at least about 2 GPa, and a density of at least about 0.85 g/cm$^3$. In another embodiment, the first layer has a draw ratio of at least about 6. In another embodiment, the first layer has a modulus of at least about 3 GPa or at least about 4 GPa. In another embodiment, the first layer has a density of at least about 1.0 g/cm$^3$. A first layer having a high modulus is preferred for better performance in applications such as tire cord, cap-ply, overlay or carcass ply for tires. Lower density for these fibers would be preferred so as to yield a lower weight. Voided fibers would generally tend to have lower densities than their unvoided counterparts.

Figure 6:
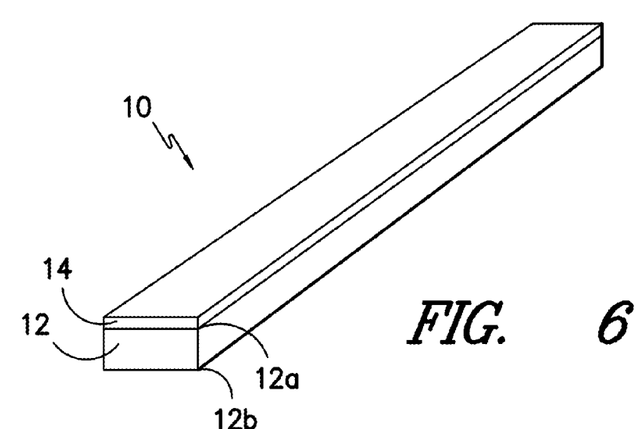
FIG. 6 illustrates schematically an embodiment of an exemplary tape element having two layers.
Figure 7:
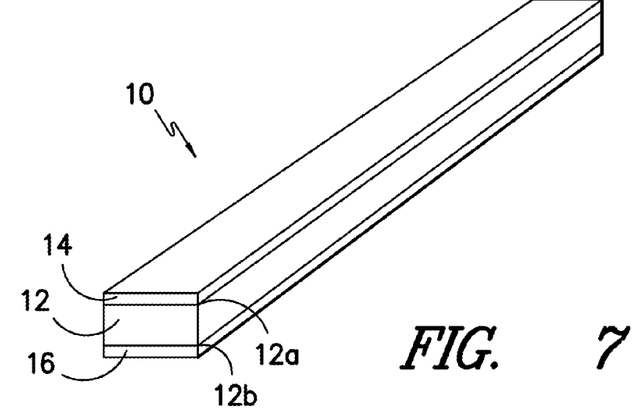
FIG. 7 illustrates schematically an embodiment of an exemplary tape element having three layers.

In one embodiment, the fiber contains a second layer such as shown in FIG. 6. FIG. 6 shows a fiber 10 having a first layer with an upper surface 12a and a lower surface 12b with a second layer 14 on the upper surface 12a of the first layer 12. There may be an additional third layer 16 as shown in FIG. 7 on the lower surface 12b of the first layer 12. While the second layer 14 and third layer 16 are shown on a fiber 10 being a rectangular cross-section tape element, the second and/or third layers may be on any shaped fiber. If the second layer 14 and third layer 16 are applied to a fiber without flat sides, the upper half of the circumference would be designated as the "upper" surface and the lower half of the circumference would be designated as the "lower" surface.

The optional second layer 14 and third layer 16 may be formed at the same time as the first layer in a process such as co-extrusion or may be applied after the first layer 12 is formed in a process such as coating. The second and third layers preferably contain a polymer of the same class as the polymer of the first layer, but may also contain additional polymers. In one embodiment, the second and/or third layers contain a polymer a block isocynate polymer. The second and third layers 14, 16 may help adhesion of the fiber to the rubber. Preferably, the melting temperature ($T_m$) of the first layer 12 is greater than the $T_m$ of the second layer 14 and third layer 16.

Figure 8:
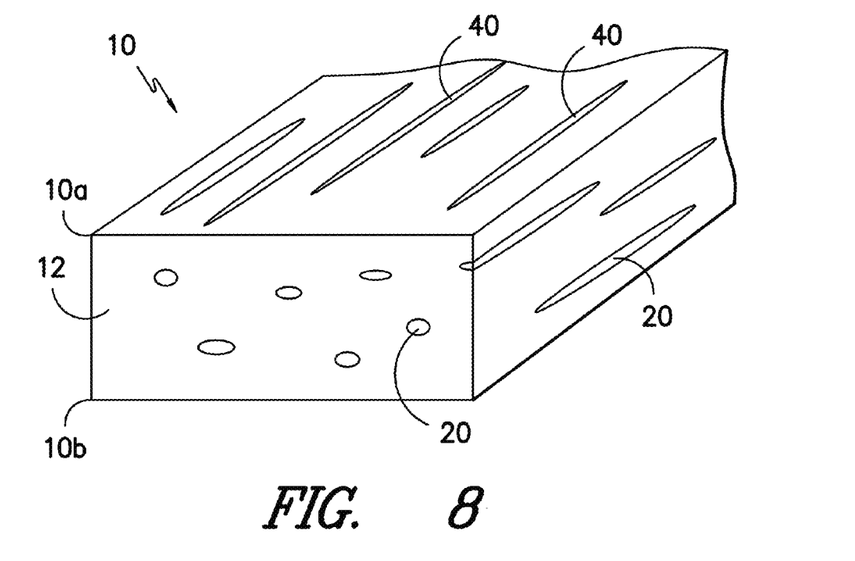
FIG. 8 illustrates schematically an embodiment of an exemplary tape element having voids and surface crevices.
Figure 9:
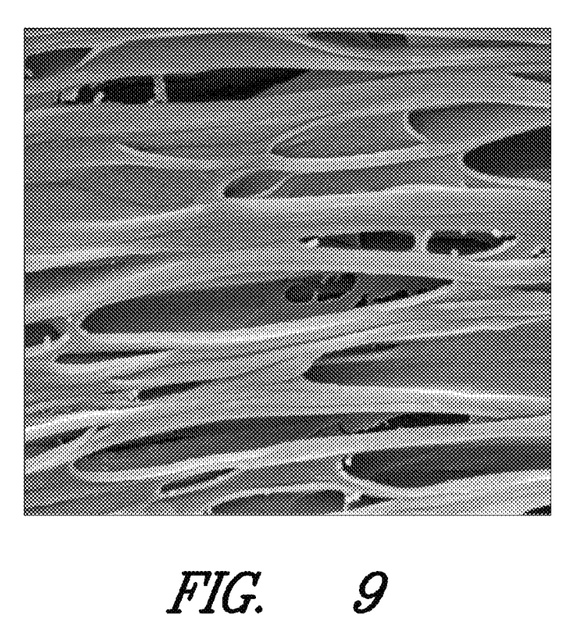
FIG. 9 is a micrograph at 50,000× magnification of a cross-section of one embodiment of the fiber containing voids.

In one embodiment, the fibers 10 contain a plurality of voids. FIG. 8 shows a fiber 10 having a first layer 12 containing a plurality of voids 20. FIG. 9 is a micrograph at 50,000× magnification of a cross-section of one embodiment of the fiber containing voids. "Void" is used herein to mean devoid of added solid and liquid matter, although it is likely the "voids" contain gas. While it has been generally accepted that voided fibers may not have the physical properties needed for use as reinforcement in rubber articles, it has been shown that the voided fibers have some unique benefits. Firstly, presence of voids in the fiber occurs at the cost of the polymer mass. This means that the density of these fibers would be lower than their non-voided counterparts. The volume fraction of the voids would determine the percentage by which the density of this fiber would be lower than the polymer resin. Secondly, the voids act as bladders for an adhesive promoter to be infused into the voided layer/voided fiber, thus providing an anchoring effect. Thirdly, the shape of these voids may control the crack propagation front in an event such as fatigue. The extra surface available for crack propagation would reduce the loss of stress singularity in a cyclic fatigue event involving tensile and/or compressive loading. For the thermoplastic polymers making up the first layer 12 of the fiber 12, the high shear flows during the over-drawing layers to chain orientation and elongation leading to the presence of polymer depleted regions or voids. The voids may be present in any or all of the layers 12, 14, 16 of the fibers 10. In addition, the fibrous layer 100 may contain some fibers having no voids and some fibers having voids.

The voids 20 typically have a needle-like shape meaning that the diameter of the cross-section of the void perpendicular to the fiber length is much smaller than the length of the void due to the monoaxially orientation of the fiber. This shape is due to the monoaxially drawn nature of the fibers 10.

In one embodiment, the voids are in the fiber in an amount of between about 3 and 20% by volume. In another embodiment, the voids are in the fiber in an amount of between about 3 and 18% vol, about 3 and 15% vol, 5 and 18% vol, or about 5 and 10% vol. The density is inversely proportional to the void volume. For example if the void volume is 10%, then the density is reduced by 10%. Since the increase in the voids is typically observed at higher draw ratios (which results in higher strength), the reduction in density leads to an increase in the specific strength and modulus of the fiber which is desired for several applications such as high performance tire reinforcements.

In one embodiment, the size of the voids formed have a diameter in the range of between about 50 and 400 nm, more preferably 100 to 200 nm, and a length of between about 1 and 6 microns, more preferably between about 2 and 3 microns.

The voids 20 in the fiber 10 may be formed during the monoaxially orientation process with no additional materials, meaning that the voids do not contain any void-initiating particles. The orientation in a fiber bundle is the driving factor for the origin of voids in the fibers. It is believed that slippages between semi-molten materials lead to the formation of voids. The number density of the voids depends on the viscoelasticity of the polymer element. The uniformity of the voids along the transverse width of the oriented fiber depends on whether the complete polymer element has been oriented in the drawing process along the machine direction. It has been observed that in order for the complete polymer element to be oriented in the drawing process, the heat has to be transferred effectively from the heating element (this could be water, air, infra-red, electric and so on) to the polymer fiber. Conventionally, in industrial processes that utilize a hot air convective heating, one feasible way to orient polymer fibers and still maintain industrial speeds is to restrict the polymer fibers in terms of its width and thickness. This means that complete orientation along the machine direction would be achievable more easily when the polymer fibers are extruded from slotted dies or when the polymer is extruded through film dies and then slit into narrow widths before orientation.

In another embodiment, the fibers 10 contain void-initiating particles. The void-initiating particles may be any suitable particle. The void-initiating particles remain in the finished fiber and the physical properties of the particles are selected in accordance with the desired physical properties of the resultant fiber. When there are void-initiating particles in the first layer 12, the stress to the layer (such as mono-axial orientation) tends to increase or elongate this defect caused by the particle resulting in elongation a void around this defect in the orientation direction. The size of the voids and the ultimate physical properties depend upon the degree and balance of the orientation, temperature and rate of stretching, crystallization kinetics, and the size distribution of the particles. The particles may be inorganic or organic and have any shape such as spherical, platelet, or irregular. In one embodiment, the void-initiating particles are in an amount of between about 2 and 15% wt of the fiber. In another embodiment, the void-initiating particles are in an amount of between about 5 and 10% wt of the fiber. In another embodiment, the void-initiating particles are in an amount of between about 5 and 10% wt of the first layer.

Figure 10A:
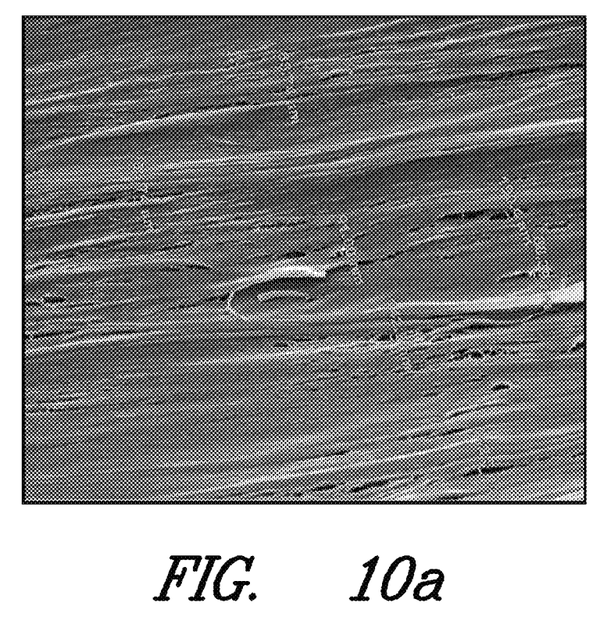
FIG. 10a is a micrograph at 20,000× magnification of a cross-section of one embodiment of the fiber containing voids and void-initiating particles showing some diameter measurements of the voids.
Figure 10B:
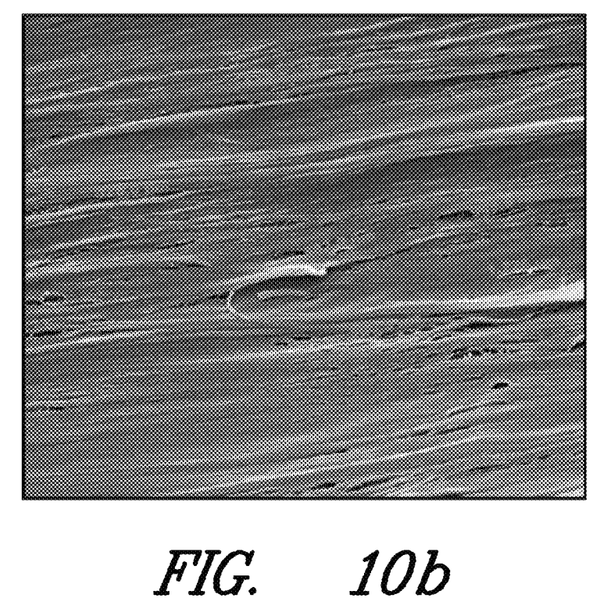
FIG. 10b is a micrograph at 20,000× magnification of a cross-section of one embodiment of the fiber containing voids and void-initiating particles showing some length measurements of the voids.

In one preferred embodiment, the void-initiating particle is nanoclay. In one embodiment, the nanoclay is a cloisite with 10% of the clay having a lateral dimension less than 2 μm, 50% less than 6 μm and 90% less than 13 μm. The density of the nanoclay is around 1.98 g/cm$^3$. Nanoclay may be preferred in some applications for a variety of reasons. Firstly nanoclay has a good miscibility with a variety of polymers, polyamides in particular. Secondly the high aspect ratio of nanoclay is presumed to improve several mechanical properties due to preferential orientation in the machine direction. In one embodiment, the nanoclay is in an amount of between about 5 and 10% wt of the fiber. In another embodiment, the nanoclay is in an amount of between about 5 and 10% wt of the first layer. FIG. 10a is a micrograph at 20,000× magnification of a cross-section of one embodiment of the fiber containing voids and void-initiating particles showing some diameter measurements of the voids and FIG. 10b is a micrograph at 20,000× magnification of a cross-section of one embodiment of the fiber containing voids and void-initiating particles showing some length measurements of the voids.

The second and third layers 14, 16 of the fiber 10 may be voided or substantially non-voided. Having non-voided skin layers (second and third layers 14, 16) may help with controlling the size and concentration of the voids throughout the first layer 12 as the skin layers reduce the edge effects of the extrusion process on the inner first layer 12. In one embodiment, the second and/or third layers 14, 16 contain void-initiating particles, voids, and surface crevices while the first layer 12 contains voids but not void-initiating particles.

Figure 11:
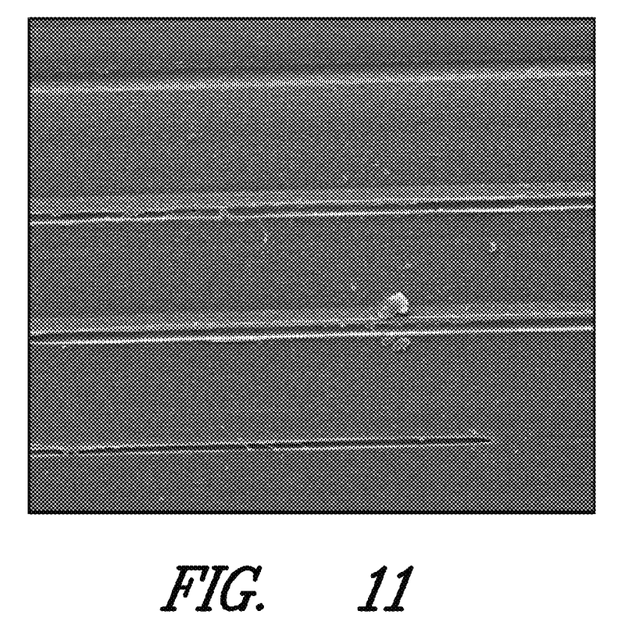
FIG. 11 is a micrograph at 1,000× magnification of a surface of one embodiment of the fibers having crevices.
Figure 12:
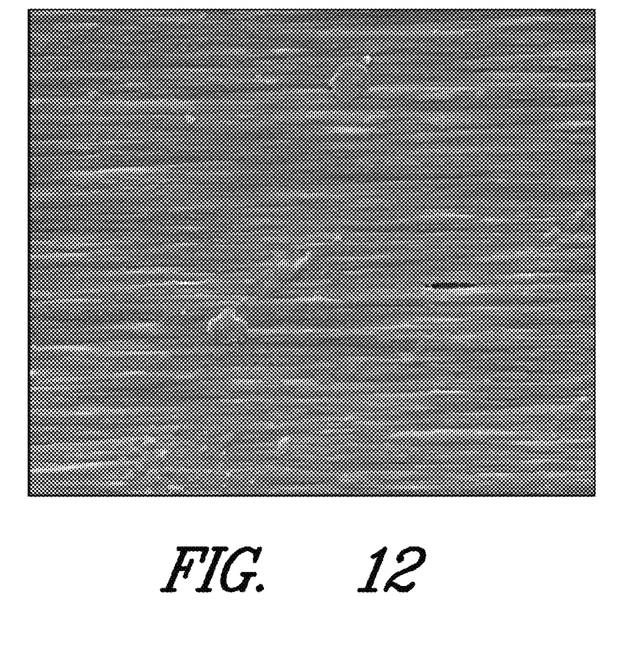
FIG. 12 is a micrograph at 20,000× magnification of a surface of one embodiment of the fibers having crevices.

Referring back to FIG. 8, in another embodiment, the fibers 10 contain crevices 40 on at least one outermost surface (upper surface 10a or lower surface 10b) of the fiber 10. The fiber 10 upper surface 10a corresponds to the first layer 12 upper surface 12a and the fiber layer 10 lower surface 10b corresponds to the first layer 12 lower surface 12b if the fiber 10 contains only a first layer. The crevices may also be present in the second and/or third layers 14, 16 if present forming the outmost surface of the fibers 10. FIG. 11 is a micrograph at 1,000× magnification of a surface of one embodiment of the fibers having crevices. FIG. 12 is a micrograph at 20,000× magnification of a surface of one embodiment of the fibers having crevices.

Figure 13:
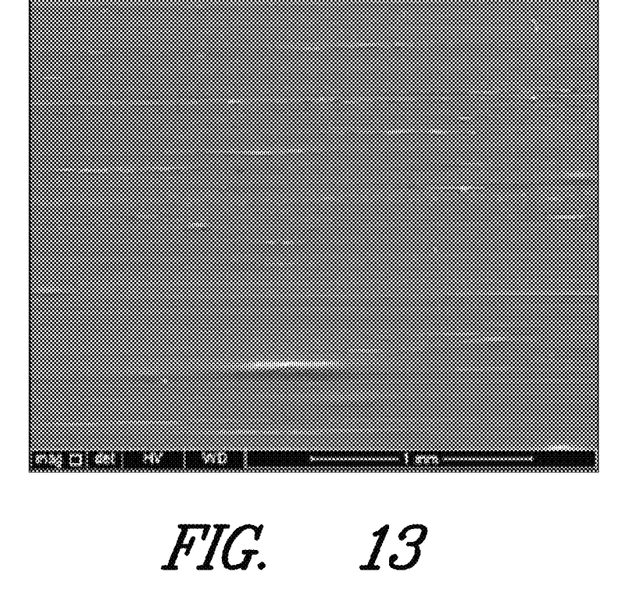
FIG. 13 is a micrograph at 100,000× magnification of a surface of one embodiment of the fibers having crevices.

The crevices, also known as valleys, channels, or grooves are oriented along the length of the fiber 10 in the direction of monoaxial orientation. The average size of these crevices is about ranged anywhere between 300 µm to 1000 µm in length and are in a frequency of between about 5-9 crevices/mm$^2$ as shown in FIG. 13, taken at 100,000× magnification. The crevices are formed when there is a defect in the surface of the fiber during the drawing or orientation process. In some embodiments, the nanoclay particle or agglomerated nanoclay particles can act as induced defects. If a nanoclay particle is present in the polymer element, the orientation of the polymer element takes place around the induced crack front and propagates along that front in the machine orientation direction leading to the formation of crevices.

In one embodiment, the crevices are formed by the void-initiating particles. Preferably, the crevices are formed from nanoclay void-initiating particles. While surface defects such as crevices are typically viewed as a defect and are minimized or eliminated in fibers, it has been shown that fibers 10 having crevices 40 display excellent adhesion to rubber when embedded into the rubber when the fibers within the fibrous layers are coated with an adhesion promoter. While not being bound to any particular theory, it is believed that the adhesion promoter at least partially impregnates and fills the crevices forming an anchor and improving the adhesion between the fiber and the rubber. In fact, when tested, the cohesion between the rubber to itself fails before the adhesion between the fiber and the rubber fails.

Referring back to FIG. 1, the fibrous layer 100 containing fiber 10 may be any suitable fibrous layer such as a knit, woven, non-woven, and unidirectional textile. Preferably, the fibrous layer 100 has an open enough construction to allow subsequent coatings (such as rubber) to pass through the fibrous layer 100 minimizing window pane formation.

In one embodiment, the fibrous layer is a woven textile, for example, plain, satin, twill, basket-weave, poplin, jacquard, and crepe weave textiles. Preferably, the woven textile is a plain weave textile. It has been shown that plain weaves have good abrasion and wear characteristics. A twill weave has been shown to have good properties for compound curves so may also be preferred for rubber articles.

In another embodiment, the fibrous layer is a knit, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face.

In another embodiment, the fibrous layer 100 is a multi-axial, such as a tri-axial fabric (knit, woven, or non-woven). In another embodiment, the fibrous layer 100 is a bias fabric. In another embodiment, the fibrous layer 100 is a non-woven. The term non-woven refers to structures incorporating a mass of yarns that are entangled and/or heat fused so as to provide a coordinated structure with a degree of internal coherency. Non-woven fabrics for use as the fibrous layer 100 may be formed from many processes such as for example, meltspun processes, hydroentangeling processes, mechanically entangled processes, stitch-bonded and the like.

In another embodiment, the fibrous layer 100 is a unidirectional and may have overlapping fiber or may have gaps between the fibers. In one embodiment, a fiber is wrapped continuously around the rubber article to form the unidirectional fibrous layer. In some embodiments, inducing spacing between the fibers may lead to slight rubber bleeding between the fibers which may be beneficial for adhesion.

Figure 14:
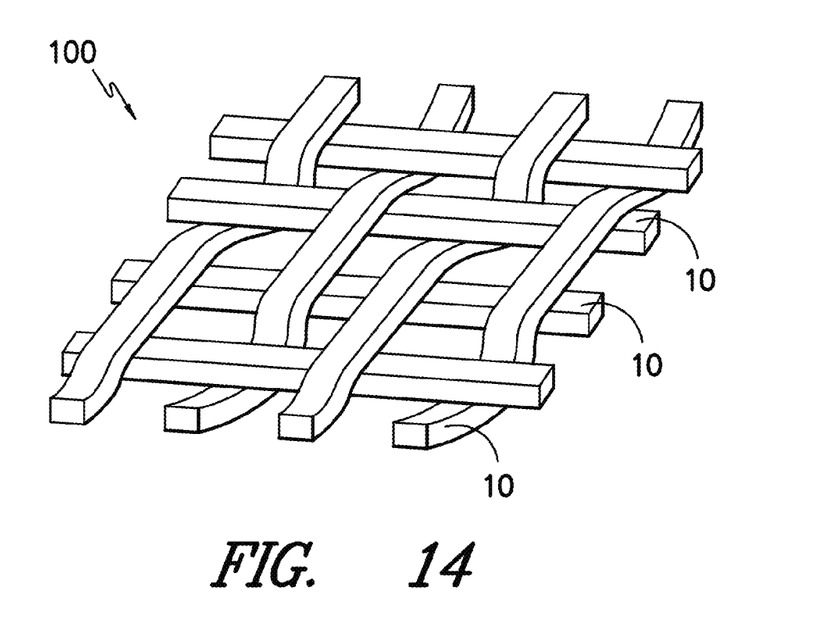
FIG. 14 illustrates schematically an embodiment of a woven fabric made from tape elements.

In one example, the fibrous layer 100 of FIG. 1 is a woven textile (shown in FIG. 14) embedded into rubber so that all that is shown are the ends of the fibers 10.

In another embodiment, the fibrous layer 100 contains fibers and/or yarns that have a different composition, size, and/or shape to the fibers 10. These additional fibers may include, but are not limited to: polyamide, aramid (including meta and para forms), rayon, PVA (polyvinyl alcohol), polyester, polyolefin, polyvinyl, nylon (including nylon 6, nylon 6,6, and nylon 4,6), polyethylene naphthalate (PEN), cotton, steel, carbon, fiberglass, steel, polyacrylic, polytrimethylene terephthalate (PTT), polycyclohexane dimethylene terephthalate (PCT), polybutylene terephthalate (PBT), PET modified with polyethylene glycol (PEG), polylactic acid (PLA), polytrimethylene terephthalate, nylons (including nylon 6 and nylon 6,6); regenerated cellulosics (such as rayon or Tencel); elastomeric materials such as spandex; high-performance fibers such as the polyaramids, and polyimides natural fibers such as cotton, linen, ramie, and hemp, proteinaceous materials such as silk, wool, and other animal hairs such as angora, alpaca, and vicuna, fiber reinforced polymers, thermosetting polymers, blends thereof, and mixtures thereof. These additional fibers/yarns may be used, for example, in the warp direction of a woven fibrous layer 100, with the fibers 10 being used in the weft direction.

In one embodiment, the fibers are surrounded at least partially by an adhesion promoter. A frequent problem in making a rubber composite is maintaining good adhesion between the rubber and the fibers and fibrous layers. A conventional method in promoting the adhesion between the rubber and the fibers is to pretreat the yarns with an adhesion layer typically formed from a mixture of rubber latex and a phenol-formaldehyde condensation product wherein the phenol is almost always resorcinol. This is the so called "RFL" (resorcinol-formaldehyde-latex) method. The resorcinol-formaldehyde latex can contain vinyl pyridine latexes, styrene butadiene latexes, waxes, fillers and/or other additives. "Adhesion layer" used herein includes RFL chemistries and other non-RFL rubber adhesive chemistries.

In one embodiment, the adhesion chemistries are not RFL chemistries. In one embodiment, the adhesion chemistries do not contain formaldehyde. In one embodiment the adhesion composition comprises a non-crosslinked resorcinol-formaldehyde and/or resorcinol-furfural condensate (or a phenol-formaldehyde condensate that is soluble in water), a rubber latex, and an aldehyde component such as 2-furfuraldehyde. The composition may be applied to textile substrates and used for improving the adhesion between the treated textile substrates and rubber materials. More information about these chemistries may be found in U.S. application Ser. No. 13/029, 293 filed on Feb. 17, 2011, which is incorporated herein in its entirety.

The adhesion layer may be applied to the fibers before formation into a fibrous layer or after the fibrous layer is formed by any conventional method. Preferably, the adhesion layer is a resorcinol formaldehyde latex (RFL) layer or rubber adhesive layer. Generally, the adhesion layer is applied by dipping the fibrous layer or fibers in the adhesion layer solution. The fibrous layer or fibers then pass through squeeze rolls and a drier to remove excess liquid. The adhesion layer is typically cured at a temperature in the range of 150° to 200° C.

The adhesion promoter may also be incorporated into a skin layer (the second and/or third layer) of the fiber or may be applied to the fiber and/or fibrous layer is a freestanding film. Thermoplastic films in this category consist of various polyamides and co-polymers thereof, polyolefins and co-polyolefins thereof, polyurethanes and methymethacrylic acid. Examples of these films include 3M™ 845 film, 3M™ NPE-IATD 0693, and Nolax™ A21.2242 film.

The fibers may be formed in any suitable manner or process. There are two preferred methods for forming the reinforced rubber article. The first begins with slit extruding polymer to form fibers (in one embodiment the fibers are tape elements having a rectangular cross-section). The die typically contains between 5 and 60 slits, each one forming a fiber. In one embodiment, the each slit die has a width of between about 15 mm and 50 mm and a thickness of between about 0.6 and 2.5 mm. The fibers once extruded are typically 4 to 12 mm wide. The fibers may be extruded having one layer or may have a second layer and/or a third layer using co-extrusion.

Next, the fibers are monoaxially drawn. In one embodiment, the fibers are drawn to a ratio of preferably about 5 or greater resulting in a fiber having a modulus of at least about 2 GPa and a density of at least about 0.85 g/cm$^3$.

Once the fibers are formed, a second and/or third layer may be applied to the fibers in any suitable manner, including but not limited to, lamination, coating, printing, and extrusion coating. This may be done before or after the monoaxial orientation step.

In one embodiment, the drawing of the fibers causes voiding to occur in the fiber. In one embodiment, the voids formed are in an amount of between about 3 and 18% vol. In another embodiment, the extrudant contains polymer and void-initiating particles causing voiding in the fiber and/or crevices on the surface of the fiber to form.

The fibers are formed into a fibrous layer which includes wovens, non-wovens, unidirectionals, and knits. The fibers are then optionally coated with an adhesion promoter such as an RFL coating and at least partially embedded (preferably fully embedded) into rubber. In the embodiments where the fibers contain crevices, it is preferred the adhesion coating at least partially fills the crevices.

In the second method, a polymer is extruded into a film. The film may be extruded having one layer or may have a second layer and/or a third layer using co-extrusion. Next, the film is slit into a plurality of fibers. In one embodiment, the fibers are tape elements having rectangular cross-sectional shapes. These fibers are then monoaxially drawn. In one embodiment, the fibers are drawn to a ratio of preferably about 5 or greater resulting in a fiber having a modulus of at least about 2 GPa and a density of at least about 0.85 g/cm3.

Once the fibers are formed, a second and/or third layer may be applied to the fibers in any suitable manner, including but not limited to, lamination, coating, printing, and extrusion coating. This may be done before or after the monoaxial orientation step.

In one embodiment, the drawing of the fibers causes voiding to occur in the fiber. In one embodiment, the voids formed are in an amount of between about 3 and 18% vol. In another embodiment, the extrudant contains polymer and void-initiating particles. When monoaxially oriented, this causes voiding in the fiber and/or crevices on the surface of the fiber to form.

The fibers are formed into a fibrous layer which includes wovens, non-wovens, unidirectionals, and knits. The fibers are then optionally coated with an adhesion promoter such as an RFL coating and at least partially embedded into rubber. In the embodiments where the fibers contain crevices, it is preferred the adhesion coating at least partially fills the crevices.

In one embodiment, the die extruding the film or fiber has a rectangular cross-section (having an upper side, a lower side, and 2 edge sides) where at least one of the upper or lower sides of the die has a serrated surface. The may produce films or films having an advantageous surface structure or surface texture.

In another embodiment, the fibers are heat treated before they are formed into the fibrous layer. Heat treatment of fibers offers several advantages such as higher modulus, higher strength, lower elongation and especially lower shrinkage. Methods to heat treat the fibers include hot air convective heat treatment, steam heating, infra-red heating or conductive heating such as stretching over hot plates—all under tension.

Test Methods

Peel Test: The T-peel test was conducted on an MTS tensile tester at a speed of 12 inch/min. One end of the same (preferably the rubber side) was fixed onto the lower jaw and the fabric was fixed onto the upper jaw. The peel strength of the fabric from the rubber was measured from the average force to separate the layers. A release liner was added on the edge of the sample (a half an inch) between the fibers and the rubber to facilitate the peel test.

The peel strength measured in the above test indicates the force required to separate the single fiber, or unidirectional array of fibers from the rubber. In all the experiments, the array of fibers is pulled at 180 degrees to the rubber sample. In all samples the thickness of the rubber was approximately 3 mm.

EXAMPLES

The invention will now be described with reference to the following non-limiting examples, in which all parts and percentages are by weight unless otherwise indicated.

Example 1

Example 1 was a monofilament nylon fiber having a circular cross-sectional shape with a diameter of 240 µm. The nylon used was Nylon 6,6 available from Invista™ as Nylon 6,6 SSP-72. The nylon was extruded out of a slotted die which had 60 slots each slot having a diameter of 1.1 mm. The nylon was extruded at 300° C. at a rate of 20 kg/hour. The resultant fiber was then cooled to 32° C. and monoaxially oriented to a draw ratio of 5. The draw was done in a three stage draw line with a draw of 4, 1.25 and 1 in the first, second and third stages respectively. The finished nylon fiber had a modulus of 1 GPa, a density of 1.14 g/cm$^3$. The fiber contained essentially no voids or crevices on the surface of the fiber.

The monofilament nylon fiber was coated with an RFL formulation utilizing a resorcinol pre-condensate available from Indspec Chemical Corporation, as Penacolite-2170 and a vinyl-pyridine latex available from Omnova Solutions, as Gentac VP 106 at a (coating weight) of 25% by weight of the dry fibers. The coated fibers were then air-dried and cured in an oven at 190° C. for three minutes. The cured fibers were then pressed onto the rubber (available from Akron Rubber Compounding as RA306) in a mold at 300 psi, such that the entire surface of the fiber was embedded into the rubber and the stock was cured at 160° C. for 30 minutes. In order to cover a 0.5 inch (1.27 cm) of rubber, seven fibers were placed 1.7 mm apart forming a unidirectional fibrous layer. A peel test was conducted as described above with the peel strength being 77 lb/inch. The resultant peeled fibers also had a small amount of rubber still attached. This indicated a slight cohesive failure of rubber (failure of rubber attached to the surface of the nylon fibers from the bulk rubber). This cohesive failure is typical when any open fabric or open fibrous layer gets embedded due to the open structure of the fabric, through which rubber can flow and encapsulate the fabric, and adhere to other rubber.

Example 2

Example 2 was a multi-filament nylon fiber. To form the multi-filament fiber, two nylon fibers formed from nylon available from Kordsa Global under the trade name T-728 having a circular cross-sectional shape with a denier of 940 were Z twisted together to form a multi-filament nylon fiber having a denier of 1880. The multi-filament twisted fiber had a modulus of 3 GPa and a density of 1.14 g/cm$^3$. The fiber contained essentially no voids or crevices on the surface of the fiber.

The multi-filament nylon fiber was coated with an RFL formulation utilizing a resorcinol pre-condensate available from Indspec Chemical Corporation, as Penacolite-2170 and a vinyl-pyridine latex available from Omnova Solutions, as Gentac VP 106 at a (coating weight) of 25% by weight of the dry fibers. The coated fibers were then air-dried and cured in an oven at 190° C. for 3 minutes. The cured fiber was then embedded into rubber (available from Akron Rubber Compounding as RA306) such that the entire surface of the fiber was embedded into the rubber and the stock was cured at 160° C. for 30 minutes. In order to cover a 0.5 inch (1.27 cm) of rubber, seven fibers were placed at a distance 1.75 mm apart forming a unidirectional fibrous layer. A peel test was conducted as described above with the peel strength being 59 lb/inch. As in example 1, similar cohesive failure of rubber was observed.

Example 3

Example 3 was a nylon film (not fiber) having a rectangular cross-sectional shape with a width of 25 mm and a height of 200 µm. The nylon used was nylon 6,6 available from Invista™ as Nylon 6,6 SSP-72. The nylon was extruded out of a film die which was 4" wide and 1 mm height. The nylon was extruded at 300° C. at a rate of 2 kg/hour. The resultant film was then cooled to 32° C. and not drawn or oriented. The nylon film was brittle and difficult to handle resulting in the film easily cracking. The finished nylon film had a modulus of 500 MPa and a density of 1.14 g/cm$^3$. The film contained essentially no voids or crevices on the surface of the film, but had extremely high surface roughness.

The nylon film was coated with an RFL formulation utilizing a resorcinol pre-condensate available from Indspec Chemical Corporation, as Penacolite-2170 and a vinyl-pyridine latex available from Omnova Solutions, as Gentac VP 106 at a (coating weight) of 25% by weight of the film. The coated film was then air-dried and cured in an oven at 190° C. for three minutes. The cured film was then pressed onto rubber (available from Akron Rubber Compounding as RA306) such that the entire surface of the film was on one side of the rubber and the stock was cured at 160° C. for 30 minutes. A peel test was conducted as described above with the peel strength being 2 lb/inch. One of the reasons for this low value was because of the inability of the RFL adhesive to bond to the surface of the material and the film to be completely pressed onto the rubber surface (meaning that the surface of the film was not completely embedded in the rubber.

Example 4

Example 4 was a mono-layer nylon fiber having a rectangular cross-sectional shape with a width of 2 mm and a height of 75 µm. The nylon used was Nylon 6,6 available from Invista™ as Nylon 6,6 SSP-72. The polymer was extruded out of a slotted die which had 12 slots each slot having dimensions of 25 mm by 0.9 mm. The nylon was extruded at 300° C. at a rate of 20 kg/hour. The resultant tape element was then cooled to 32° C. and monoaxially oriented to a draw ratio of between 5 and 6. The draw was done in a three stage draw line with a draw of 4, 1.2, and 1.1 in the first, second and third stages respectively. It is predicted that the same modulus and strength could also be attained if the draw ratios were distributed differently throughout the draw zones. For example a modulus of 6 GPa could also be obtained if the draw ratios were 1.5, 3.3 and 1.1 in the first, second and third stages respectively. The finished nylon tape element had a modulus of 6 GPa, a density of 1.06 g/cm$^3$, and a void volume of 8% vol (by volume) of the fiber. Micrographs of the fiber can be seen in FIG. 9. The voids extended discontinuously throughout the longitudinal section of the fiber. The size of the voids ranged from 50-150 nm in width and 0-5 µm in length. The density of the voids was 8% by volume. The fiber contained essentially no crevices on the surface of the fiber.

The resultant nylon fiber (being a tape element) was then coated with an RFL formulation utilizing a resorcinol pre-condensate available from Indspec Chemical Corporation, as Penacolite-2170 and a vinyl-pyridine latex available from Omnova Solutions, as Gentac VP 106 at a (coating weight) of 25% by weight of the dry tapes. The coated tapes were then air-dried and cured in an oven at 190° C. for 3 minutes. The coated fiber was then laid onto rubber (available from Akron Rubber Compounding as RA306) in a unidirectional pattern having no spaces between the fibers such that the resultant unidirectional fibrous layer covered essentially the whole surface of the rubber. This was cured at 160° C. for 30 minutes. In order to cover a 0.5 inch (1.27 cm) strip of rubber, six rectangular shaped fibers had to be laid. A peel test conducted as described above resulted in rubber breakage at 197 lb/inch. The peel test force result was the force required to break the rubber in the sample. When the peel test was conducted, the fibers did not pull out of the rubber so the rubber broke. This indicates that the peel strength was at least 197 lb/inch, but the exact number cannot be determined because of the rubber breakage.

Example 5

Example 5 was the same as Example 4, except that the total draw ratios for the fibers were 3. The finished nylon fiber had a modulus of 3.5 GPa, a density of 1.06 g/cm$^3$, and a void volume of 8% vol (by volume) of the fiber.

Example 6

Example 6 was the same as Example 4, except that the total draw ratios for the fibers were 4. The finished nylon fiber had a modulus of 4.1 GPa, a density of 1.06 g/cm$^3$, and a void volume of 8% vol (by volume) of the fiber. Comparing Examples 4, 5, 6, the modulus and strength appear to scale with the draw ratio proportionately.

Example 7

Example 7 was a monolayer nylon fiber having a rectangular cross-sectional shape with a width of 4 mm and a height of 130 µm. The polymer used was Nylon 6,6 available from Invista™ as Nylon 6,6 SSP-72. The nylon was extruded out of a slotted die which had 12 slots each slot having dimensions of 25 mm by 0.9 mm. The nylon was extruded at 300° C. at a rate of 60 kg/hour. The resultant tape element was then cooled to 32° C. and monoaxially oriented to a draw ratio of between 5 and 6. The draw was done in a three stage draw line with a draw of 3.1, 1.65 and 1.1 in the first, second and third stages respectively. The finished nylon tape element had a modulus of 800 MPa, a density of 1.14 g/cm³. The fiber contained essentially no voids or crevices on the surface of the fiber. Comparing the fibers of Example 7 to Example 4, the fibers of Example 7 were twice as wide, almost twice as thick and were extruded in the same size slot die but at three times the output. As mentioned previously, the orientation in a fiber bundle is the driving factor for the origin of voids in the fibers. The presence and uniformity of the voids along the transverse width of the oriented fiber depends on whether the complete polymer element has been oriented in the drawing process along the machine direction. The lack of voids is due to the fact that effective heat transfer has not occurred in the polymer element to orient it completely. Regions of oriented and un-oriented sections were obtained in the polymer tapes.

The nylon fiber was coated with an RFL formulation utilizing a resorcinol pre-condensate available from Indspec Chemical Corporation, as Penacolite-2170 and a vinyl-pyridine latex available from Omnova Solutions, as Gentac VP 106 at a (coating weight) of 25% by weight of the dry tapes. The coated fiber was then laid onto rubber (available from Akron Rubber Compounding as RA306 in a unidirectional pattern having no spaces between the fibers such that the resultant unidirectional fibrous layer covered essentially the whole surface of the rubber. This was cured at 160° C. for 30 minutes. In order to cover a 0.5 inch (1.27 cm) strip of rubber, six rectangular shaped fibers had to be laid.

Example 8

The coated fibers of Example 4 were laid onto rubber (available from Akron Rubber Compounding as RA306) in a unidirectional pattern having 0.5 mm spaces between the fibers forming a unidirectional fibrous layer that did not cover the whole surface of the rubber. This was cured at 160° C. for 30 minutes. For a 0.5 inch (1.27 cm) strip of rubber, six rectangular shaped fibers were laid. A release film was placed between the fiber layer and the rubber on one edge for ease of the peel test. A peel test conducted as described above resulted in rubber breakage at 180 lb$_f$/inch indicating that the peel strength was greater than this value. This value was almost equal to the peel strength of the unidirectional fibrous layer without spaces between the fibers (Example 4). The slight variation in the values is unavoidable since this force is indicative of the breaking strength of rubber and hence depends on the rubber thickness.

Example 9

The nylon film of Example 3 was adhesively bonded to rubber (available from Akron Rubber Compounding as RA306) utilizing an adhesive film available from 3M as 3M 845 film. The adhesive film was composed of an acrylic copolymer, a tackifier and vinyl carboxylic acid. The film was pressed into the rubber (with the adhesive film between the rubber and the nylon film), such that the entire surface of the nylon film was not covered (not embedded) by rubber and then sample was cured at 160° C. for 30 minutes. A peel test was conducted as described above with the peel strength being 27 lb$_f$/inch which is an increase in peel strength as compared to Example 3 using an RFL coating adhesive.

Example 10

The fibers of Example 10 were similar to the fiber of Example 4, with the addition of void-initiating particles. Example 10 was a monolayer nylon fiber having a rectangular cross-sectional shape with a width of 2 mm and a height of 75 µm. The polymer used was Nylon 6,6 available from Invista™ as Nylon 6,6 SSP-72 and contained 7% by wt. of nanoclay (cloisite) available from Southern Clay Company. The nylon was extruded out of a slotted die which had 12 slots each slot having dimensions of 25 mm by 0.9 mm. The nylon was extruded at 300° C. at a rate of 20 kg/hour. The resultant fiber (being a tape element) was then cooled to 32° C. and monoaxially oriented to a draw ratio of between 5 and 6. The draw was done in a three stage draw line with a draw of 4, 1.2 and 1.1 in the first, second and third stages respectively. As mentioned in Example 1, the same modulus and strength could also be attained if the draw ratios were distributed differently throughout the draw zones. The finished nylon fiber had a modulus of 6 GPa, a density of 1.06 g/cm³, and a void volume of 8% vol of the fiber. The voids of in the fiber can be seen in the micrographs of FIGS. 10a and 10b. The voids extended discontinuously throughout the longitudinal section of the fiber. The size of the voids ranged from 50-150 nm in width and 0-5 µm in length. The concentration of the voids was 8% by volume. The voids were similar in shape to the ones obtained without void initiating particles. The fiber also contained crevices on the surface of the fiber. These crevices present on the face of the fiber were discontinuous along the longitudinal direction of the fibers and their length ranged between about 300 µm to 1000 µm. The crevices on the surface of the fiber can be seen in the micrographs of FIGS. 11, 12, and 13.

The nylon fiber was coated with an RFL formulation utilizing a resorcinol pre-condensate available from Indspec Chemical Corporation, as Penacolite-2170 and a vinyl-pyridine latex available from Omnova Solutions, as Gentac VP 106 at a (coating weight) of 25% by weight of the dry tapes. The coated fibers were then air-dried and cured in an oven at 190° C. for 3 minutes. The coated fiber was then laid onto rubber (available from Akron Rubber Compounding as RA306) in a unidirectional pattern having no spaces between the fibers such that the resultant unidirectional fibrous layer covered essentially the whole surface of the rubber. This was cured at 160° C. for 30 minutes. In order to cover a 0.5 inch (1.27 cm) strip of rubber, six rectangular shaped fibers had to be laid. A release film was placed between the fiber layer and the rubber on one edge for ease of the peel test. A peel test conducted as described above resulted in rubber breakage at 197 lb$_f$/inch indicating that the peel strength was greater than this value.

Example 11

Example 11 was a polyester fiber having a rectangular cross-sectional shape with a width of 2 mm and a height of 60 µm. The polyester used was polyethylene terephthalate available from Nanya Plastics Corporation as PET IV 60. The polyester was extruded out of a slotted die which had 12 slots each slot having dimensions of 25 mm by 0.9 mm. The polyester was extruded at 300° C. at a rate of 20 kg/hour. The resultant fiber was then cooled to 32° C. and monoaxially oriented to a draw ratio of 7-9. The draw was done in a three stage draw line with a draw of 3.4, 2.2 and 1 in the first, second and third stages respectively. The finished polyester tape element had a modulus of 8 GPa, a density of 1.20 g/cm$^3$, and a void volume of 8% vol of the fiber. The fiber contained essentially no crevices on its surface.

The polyester fiber was coated by a two stage dip procedure using a pre-dip solution containing a caprolactam blocked iso-cyanate available from EMS as Grilbond IL-6 and curing at 225 C for three minutes, followed by dipping in a standard RFL formulation utilizing a resorcinol pre-condensate available from Indspec Chemical Corporation, as Penacolite-2170 and a vinyl-pyridine latex available from Omnova Solutions, as Gentac VP 106 at a (coating weight) of 25% by weight of the dry tapes. The coated fibers were then air-dried and cured in an oven at 190° C. for three minutes. The coated fiber was then laid onto rubber (available from Akron Rubber Compounding as RA306) in a unidirectional pattern having no spaces between the fibers such that the resultant unidirectional fibrous layer covered essentially the whole surface of the rubber. This was cured at 160° C. for 30 minutes. In order to cover a 0.5 inch (1.27 cm) strip of rubber, six rectangular shaped fibers had to be laid. When the peel test was conducted, the pulled out fibers had a large chunk of rubber still attached. The peel test resulted in adhesion strength of 120 lb/inch showing the cohesive failure of rubber.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. The process of forming a reinforced rubber article comprising, in order:
    slit co-extruding fibers having a rectangular cross-section comprising at least a first layer and a second layer, wherein the first layer comprises a polymer selected from the group consisting of polyamide, polyester, and co-polymers thereof, and wherein the second layer comprises a first polymer of the same class as the polymer of the first layer;
    orienting the fibers monoaxially to a draw ratio of at least about 5 forming monoaxially drawn fibers having an upper surface and a lower surface and having a modulus of at least about 2 GPa and a density of at least 0.85 g/cm$^3$;
    forming the monoaxially drawn fibers into a fibrous layer; and,
    embedding the fibrous layer into rubber.

2. The process of claim 1, further comprising coating the fibers with an adhesion promoter before or after forming the fibers into a fibrous layer.

3. The process of claim 1, wherein the fibrous layer is a fabric layer selected from the group consisting of woven, non-woven, unidirectional, and knit.

4. The process of claim 1, wherein orienting the fibers comprises forming a plurality of voids.

5. The process of claim 1, wherein the first layer further comprises void-initiating particles and wherein orienting the fibers comprises forming a plurality of voids.

6. The process of claim 5, wherein orienting the fibers monoaxially forms a plurality of crevices in at least the upper or lower surface of the fibers and wherein the process further comprises coating the fibers with an adhesion promoter at least partially filling the plurality of crevices of the fibers before or after forming the fiber into a fibrous layer.

7. The process of claim 1, wherein the rubber article is a tire and wherein the fibrous layer is a layer of the tire selected from the group consisting of a cap ply, a carcass ply, a chafer, a flipper, a clipper, a body ply, a shoulder ply, a belt ply, a belt separator ply, a bead wrap, and a belt edge wrap.

8. The process of claim 1, wherein the second polymer comprises block isocynates.

9. The process of forming a reinforced rubber article comprising, in order:
    co-extruding a film comprising at least a first layer and a second layer, wherein the first layer comprises a polymer selected from the group consisting of polyamide, polyester, and co-polymers thereof, and wherein the second layer comprises a first polymer of the same class as the polymer of the first layer;
    slitting the film into a plurality of fibers having a rectangular cross-section;
    orienting the fibers monoaxially to a draw ratio of at least about 5 forming monoaxially drawn fibers having an upper surface and a lower surface and having a modulus of at least about 2 GPa and a density of at least 0.85 g/cm$^3$;
    forming the monoaxially drawn fibers into a fibrous layer; and,
    embedding the fibrous layer into rubber.

10. The process of claim 9, wherein the fibrous layer is a fabric layer selected from the group consisting of woven, non-woven, unidirectional, and knit.

11. The process of claim 9, wherein orienting the fibers comprises forming a plurality of voids.

12. The process of claim 9, further comprising coating the fibers with an adhesion promoter before or after forming the fibers into a fibrous layer.

13. The process of claim 9, wherein the rubber article is a tire and wherein the fibrous layer is a layer of the tire selected from the group consisting of a cap ply, a carcass ply, a chafer, a flipper, a clipper, a body ply, a shoulder ply, a belt ply, a belt separator ply, a bead wrap, and a belt edge wrap.

14. The process of claim 9, wherein the second polymer comprises block isocynates.

15. The process of forming a reinforced rubber article comprising:
    extruding a film comprising at least a first layer, wherein the first layer comprises a polymer selected from the group consisting of polyamide, polyester, and co-polymers thereof;
    slitting the film into a plurality of fibers having a rectangular cross-section;
    coating a second layer onto the fibers, wherein the second layer comprises a first polymer of the same class as the polymer of the first layer;
    orienting the fibers monoaxially to a draw ratio of at least about 5 forming monoaxially drawn fibers having an upper surface and a lower surface and having a modulus of at least about 2 GPa and a density of at least 0.85 g/cm$^3$;
    forming the monoaxially drawn fibers into a fibrous layer; and,
    embedding the fibrous layer into rubber.

16. The process of claim 15, wherein coating a second layer onto fibers comprises coating a second layer onto the fibers before orienting the fibers.

17. The process of claim 15, wherein coating a second layer onto the fibers comprises coating a second layer onto the fibers after orienting the fibers.

18. The process of claim 15, wherein orienting the fibers comprises forming a plurality of voids.

19. The process of claim 15, wherein the second polymer comprises block isocynates.

20. The process of forming a reinforced rubber article comprising:
    slit extruding fibers having a rectangular cross-section comprising at least a first layer, wherein the first layer comprises a polymer selected from the group consisting of polyamide, polyester, and co-polymers thereof;
    coating a second layer onto the fibers, wherein the second layer comprises a first polymer of the same class as the polymer of the first layer;
    orienting the fibers monoaxially to a draw ratio of at least about 5 forming monoaxially drawn fibers having an upper surface and a lower surface and having a modulus of at least about 2 GPa and a density of at least 0.85 g/cm$^3$;
    forming the monoaxially drawn fibers into a fibrous layer; and,
    embedding the fibrous layer into rubber.

21. The process of claim 20, wherein coating a second layer onto the fibers comprises coating a second layer onto the fibers before orienting the fibers.

22. The process of claim 20, wherein coating a second layer onto the fibers comprises coating a second layer onto the fibers after orienting the fibers.

23. The process of claim 20, further comprising coating the fibers with an adhesion promoter before or after forming the fibers into a fibrous layer.

24. The process of claim 20, wherein the fibrous layer is a fabric layer selected from the group consisting of woven, non-woven, unidirectional, and knit.

25. The process of claim 20, wherein orienting the fibers comprises forming a plurality of voids.

26. The process of claim 20, wherein the first layer further comprises void-initiating particles and wherein orienting the tope elements fibers comprises forming a plurality of voids.

27. The process of claim 26, wherein orienting the fibers monoaxially forms a plurality of crevices in at least the upper or lower surface of the fibers and wherein the process further comprises coating the fibers with an adhesion promoter at least partially filling the plurality of crevices of the fibers before or after forming the fiber into a fibrous layer.

* * * * *